(12) United States Patent
Martinez et al.

(10) Patent No.: US 9,638,018 B2
(45) Date of Patent: *May 2, 2017

(54) SCAVENGING HYDROGEN SULFIDE

(71) Applicant: Ecolab USA Inc., Eagan, MN (US)

(72) Inventors: Aaron D. Martinez, Houston, TX (US); Ravindranath Mukkamala, Sugar Land, TX (US); Erick J. Acosta Otero, Sugar Land, TX (US); Joseph P. Bailey, Maracaibo (VE)

(73) Assignee: Ecolab USA Inc., St. Paul, MN (US)

( * ) Notice: Subject to any disclaimer, the term of this patent is extended or adjusted under 35 U.S.C. 154(b) by 587 days.

This patent is subject to a terminal disclaimer.

(21) Appl. No.: 14/108,617

(22) Filed: Dec. 17, 2013

(65) Prior Publication Data
US 2014/0166289 A1    Jun. 19, 2014

Related U.S. Application Data

(60) Provisional application No. 61/739,390, filed on Dec. 19, 2012.

(51) Int. Cl.
*E21B 43/34* (2006.01)
*B01D 53/52* (2006.01)
*E21B 43/25* (2006.01)

(52) U.S. Cl.
CPC .............. *E21B 43/34* (2013.01); *B01D 53/52* (2013.01); *E21B 43/25* (2013.01); *B01D 2252/202* (2013.01)

(58) Field of Classification Search
CPC ......... E21B 43/34; E21B 43/25; B01D 53/52; B01D 2252/202
See application file for complete search history.

(56) References Cited

U.S. PATENT DOCUMENTS

| | | | | |
|---|---|---|---|---|
| 3,096,294 A * | 7/1963 | Hughes | ............... | C07D 233/16 252/390 |
| 3,864,460 A | 2/1975 | Connell | | |
| 4,339,349 A * | 7/1982 | Martin | ................ | C23F 11/10 422/12 |
| 4,405,581 A * | 9/1983 | Savage | ............. | B01D 53/1493 252/189 |
| 4,421,733 A * | 12/1983 | Blytas | ................ | C01B 17/05 423/226 |
| 4,569,766 A * | 2/1986 | Kool | ................ | B01D 15/00 134/42 |
| 4,680,127 A * | 7/1987 | Edmondson | ........... | B01D 53/52 210/749 |
| 5,128,049 A * | 7/1992 | Gatlin | ............... | B01D 53/1406 210/752 |
| 5,225,103 A * | 7/1993 | Hoffmann | ......... | B01D 53/1493 252/189 |
| 5,246,597 A * | 9/1993 | Jenson | ................ | C02F 1/722 210/754 |
| 5,284,576 A * | 2/1994 | Weers | ................ | C10L 1/221 208/236 |
| 5,690,174 A * | 11/1997 | Chapman | ................ | C09K 8/52 166/275 |
| 6,024,866 A * | 2/2000 | Weers | ................ | C10L 1/221 208/236 |
| 6,068,056 A * | 5/2000 | Frenier | ................ | C09K 8/52 166/307 |
| 6,173,780 B1 * | 1/2001 | Collins | ................ | C09K 8/524 166/300 |
| 6,399,547 B1 * | 6/2002 | Frenier | ................ | C09K 8/52 252/396 |
| 6,500,237 B2 | 12/2002 | Winchester et al. | | |
| 6,887,447 B2 * | 5/2005 | Schield | ............... | C01B 17/0243 423/265 |
| 6,942,037 B1 * | 9/2005 | Arnold | ................ | C09K 8/532 166/300 |
| 7,078,005 B2 * | 7/2006 | Smith | ................ | C10L 3/10 423/226 |
| 7,216,710 B2 * | 5/2007 | Welton | ................ | C09K 8/74 166/307 |
| 8,563,481 B2 * | 10/2013 | Gatlin | ................ | C09K 8/22 507/110 |
| 9,052,289 B2 * | 6/2015 | Lawrence | ............. | G01N 21/31 |
| 9,234,125 B2 * | 1/2016 | Gatlin | ................ | C09K 8/22 |
| 2004/0096382 A1 * | 5/2004 | Smith | ................ | C10L 3/10 423/226 |

(Continued)

FOREIGN PATENT DOCUMENTS

| | | |
|---|---|---|
| EP | 1363985 B1 | 11/2003 |
| EP | 2465975 A1 | 6/2012 |
| WO | WO02051968 | 7/2002 |
| WO | WO2012128935 A3 | 3/2013 |

OTHER PUBLICATIONS

International Search Report and Written Opinion for PCT/US2013/075886, dated Mar. 28, 2014, 7 pages.

Kissel, C. L. et al., "Factors Contributing to the Ability of Acrolein to Scavenge Corrosive Hydrogen Sulfide" Society of Petroleum Engineers Journal, Oct. 1985, p. 647-655.

Kelland, M. A., "Hydrogen Sulfide Scavengers," Production Chemicals for the Oil and Gas Industry, Chapter 15, 2009, pp. 363-376.

*Primary Examiner* — Zakiya W Bates
*Assistant Examiner* — Crystal J Miller
(74) *Attorney, Agent, or Firm* — Senniger Powers LLP

(57) ABSTRACT

Alpha-hydroxy alkyl esters have been found to perform as hydrogen sulfide scavengers. A method of scavenging hydrogen sulfide includes contacting a fluid containing hydrogen sulfide with a treatment fluid including an alpha-hydroxy alkyl ester. Accordingly, the alpha-hydroxy alkyl ester reacts with the hydrogen sulfide to reduce the amount of hydrogen sulfide in the fluid. A broad range of alpha-hydroxy alkyl esters are disclosed.

15 Claims, No Drawings

(56) References Cited

U.S. PATENT DOCUMENTS

| | | | |
|---|---|---|---|
| 2005/0170974 A1* | 8/2005 | Collins | C09K 8/52 507/219 |
| 2006/0194700 A1* | 8/2006 | Gatlin | C09K 8/22 507/140 |
| 2007/0284288 A1* | 12/2007 | Gatlin | B01D 53/1468 208/208 R |
| 2010/0163255 A1* | 7/2010 | Horton | B01D 53/1468 166/403 |
| 2011/0315921 A1* | 12/2011 | Ramachandran | C02F 1/683 252/184 |
| 2012/0012507 A1* | 1/2012 | Compton | C10G 29/20 208/289 |
| 2012/0149117 A1* | 6/2012 | Lawrence | G01N 21/31 436/28 |
| 2014/0080792 A1* | 3/2014 | Jones | C02F 1/50 514/129 |
| 2014/0128294 A1* | 5/2014 | Gatlin | C09K 8/22 507/110 |
| 2014/0166282 A1* | 6/2014 | Martinez | B01D 53/1468 166/279 |
| 2014/0166288 A1 | 6/2014 | Bailey et al. | |
| 2014/0166289 A1* | 6/2014 | Martinez | E21B 43/25 166/305.1 |

* cited by examiner

SCAVENGING HYDROGEN SULFIDE

CROSS-REFERENCE TO RELATED APPLICATIONS

This application claims the benefit of U.S. Provisional Patent Application No. 61/739,390, filed on Dec. 19, 2012.

BACKGROUND

Field of the Invention

The present invention relates to a process of scavenging hydrogen sulfide from a fluid.

Background of the Related Art

Production fluids that are produced from subterranean formation will often contain hydrogen sulfide ($H_2S$). Production fluids that include a high concentration of hydrogen sulfide are sometimes referred to as being "sour" and those production fluids that include little or no hydrogen sulfide are sometimes referred to as being "sweet." Hydrogen sulfide is a toxic and pungent gas and, because it behaves as a weak acid in water, can cause corrosion of steel equipment and pipelines. Natural gas must ordinarily contain less than 4 parts per million (ppm) of hydrogen sulfide before it can be sold. Accordingly, production fluids may be "sweetened" through a process of removing the hydrogen sulfide. Typical hydrogen sulfide removal processes use an active treatment compound that reacts with the hydrogen sulfide.

Common sweetening processes pass the already produced production fluids through equipment where the hydrogen sulfide is contacted with an active treatment compound referred to as a "hydrogen sulfide scavenger" or, more simply, a "scavenger." The hydrogen sulfide scavenger reacts with the toxic hydrogen sulfide to form a nontoxic compound. Liquid scavengers, for example, may be injected into a pipeline or processing equipment

BRIEF SUMMARY

The present invention provides a method of scavenging hydrogen sulfide. The method comprises contacting a fluid containing hydrogen sulfide with a treatment fluid including at least one reaction product of a first compound with at least one carboxylic acid group and a second compound with at least one aldehyde group, wherein the hydrogen sulfide reacts with the said reaction product to reduce an amount of the hydrogen sulfide in the production fluid. In one example, the reaction product includes an alpha-hydroxy alkyl ester.

DETAILED DESCRIPTION

The present invention provides a method of scavenging hydrogen sulfide. The method comprises contacting a fluid containing hydrogen sulfide with a treatment fluid including at least one reaction product of a first compound with at least one carboxylic acid group and a second compound with at least one aldehyde group, wherein the hydrogen sulfide reacts with the said reaction product to reduce an amount of the hydrogen sulfide in the production fluid. In one example, the reaction product includes an alpha-hydroxy alkyl ester.

The method may use any one or more of a broad range of alpha-hydroxy alkyl esters. One embodiment of the alpha-hydroxy alkyl ester is the reaction product of a carboxylic acid and an aldehyde. Optionally, the carboxylic acid may be a mono carboxylic acid, dicarboxylic acid, oligomeric carboxylic acid, or polymeric carboxylic acid. Independently, the carboxylic acid and/or the aldehyde may be saturated, unsaturated or aromatic. The alpha-hydroxy alkyl ester may also be amine-free.

Another embodiment of the alpha-hydroxy alkyl ester has no nitrogen or basic nitrogen (amine functionalities). In a still further embodiment, the alpha-hydroxy alkyl ester is functionalized with a phosphate group, phosphonate group, sulfate group, sulfonate group, or hydroxyl group. In a first option, the alpha-hydroxy alkyl ester includes two phosphate groups or two sulfate groups. In a second option, the alpha-hydroxy alkyl ester includes at least two hydroxyl groups.

In a still further embodiment, the alpha-hydroxy alkyl ester is a reaction product of a mono-carboxylic acid, dicarboxylic acid, oligomeric carboxylic acid, or polymeric carboxylic acid reacted with a mono-aldehyde, dialdehyde, oligomeric aldehyde, or polymeric aldehyde. Accordingly, the reaction products may include a polyester, a cyclic di-ester, or some mixtures thereof.

Specific examples of alpha-hydroxy alkyl esters that may be used in the methods of the present invention include, without limitation, bis(hydroxymethyl) Maleate; (2E, 4E)-hydroxymethyl hexa-2,4-dienoate; (E)-hydroxymethyl but-2-enoate; (E)-bis(hydroxymethyl) O,O'-(2-hydroxypropane-1,3-diyl) difumarate; hydroxymethyl 6-(2,5-dioxo-2,5-dihydro-1H-pyrrol-1-yl)hexanoate; sorbic acid, and combinations thereof.

Embodiments of the invention may use a treatment fluid that includes between 5 and 20 volume percent of the alpha-hydroxy alkyl ester, or between 10 and 15 volume percent of the alpha-hydroxy alkyl ester. Optionally, the treatment fluid may further include a mixture of water and ethanol, such as a $^{50}/_{50}$ mixture of water and ethanol.

The fluid containing hydrogen sulfide may be any gas or liquid that contains hydrogen sulfide. The method is particularly useful to treat fluids that have been produced from a subterranean formation, but may also be used to treat industrial waste streams. In one example, the fluid containing hydrogen sulfide is a gas, such that the contact between the fluid containing hydrogen sulfide and the treatment fluid may occur in an absorption tower.

In yet another embodiment, an alpha-hydroxy alkyl ester is included in a squeeze treatment. A "squeeze treatment" is a process of delivering a treatment fluid into a treatment zone of a subterranean formation by pumping the treatment fluid downhole under pressure, then shutting in the treatment fluid for a period of time, such as between 12 and 16 hours or longer, to allow the alpha-hydroxy alkyl ester to absorb onto the surfaces of the formation before producing additional production fluids. A squeeze treatment may, in accordance with the present invention, use a treatment fluid that includes one or more alpha-hydroxy alkyl esters. For example, a treatment fluid that includes one or more alpha-hydroxy alkyl esters may be pumped under pressure through a wellbore into a subterranean formation, wherein the alpha-hydroxy alkyl ester adsorbs onto the subterranean formation in a region around the wellbore. Then, as production fluids subsequently flow from the subterranean formation into the wellbore, the hydrogen sulfide reacts with the alpha-hydroxy alkyl ester as the production fluids flow through the region around the wellbore. Accordingly, an amount of hydrogen sulfide in the production fluids is reduced before the production fluids flow into the wellbore.

An alpha-hydroxy alkyl ester and other reaction products of carboxylic acids and aldehydes selected for use in a squeeze treatment will preferably exhibit rock-surface adsorption, sulfide/mercaptan scavenging properties, and compatibility with high brine fluids both before and after the treatment compound reacts with sulfide/mercaptan species. These reaction products are also expected to not have scale issues that are known for traditional triazines and other amine-containing hydrogen sulfide scavengers.

After the alpha-hydroxy alkyl ester has been introduced into the formation, the compound absorbs onto the surfaces of the subterranean rock formation. The desired adsorption is provided by the chemical functionalities within the molecular structure of the alpha-hydroxy alkyl ester. It is believed that the oxygenation provided by the ester functionality, as well as other hydroxyl, phosphate and sulfate groups, provides the treatment compound with the ability to adsorb onto the surface of the formation.

After the treatment compound has been introduced into the formation and adsorbed on the surface of the formation, the pressure in the well is reduced to allow formation fluids to be produced from the formation and up through the well. Typical formation fluids will include connate water or brine in a mixture with liquid or gaseous hydrocarbons that contain sulfur-containing compounds, such as hydrogen sulfide or mercaptans. As those formation fluids flow through the formation toward the well, the adsorbed alpha-hydroxy alkyl ester will come into contact with, and react with, the sulfur-containing compounds. It should be appreciated that having the alpha-hydroxy alkyl ester adsorbed on the surface of the formation will increase the contact time with formation fluids, thereby increasing the likelihood of reacting with more of the sulfur-containing compounds.

Although a squeeze treatment in accordance with the present invention may be formulated and performed solely to deliver the alpha-hydroxy alkyl ester into the formation, a squeeze treatment may also include other compositions that provide other beneficial effects. In a non-limiting example, the squeeze treatment may further include an additive selected from a scale inhibitor, asphaltene inhibitor, a biocide, or some combination of the additives.

Alpha-Hydroxy Alkyl Esters

Although a number of alpha-hydroxy alkyl esters have been identified above, the structures of these and other non-limiting examples of suitable alpha-hydroxy alkyl esters are presented below.

Generic Structure:

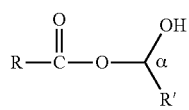

alpha-hydroxy alkyl ester where: R=aliphatic, cyclic, acyclic, saturated, olefinic, aromatic; and
R'=H, aliphatic, cyclic, acyclic, saturated, olefinic, aromatic.

Example Preparation:

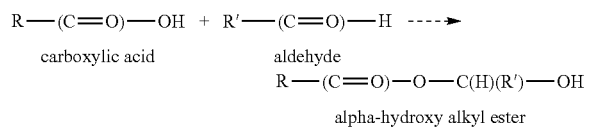

SPECIFIC EXAMPLES

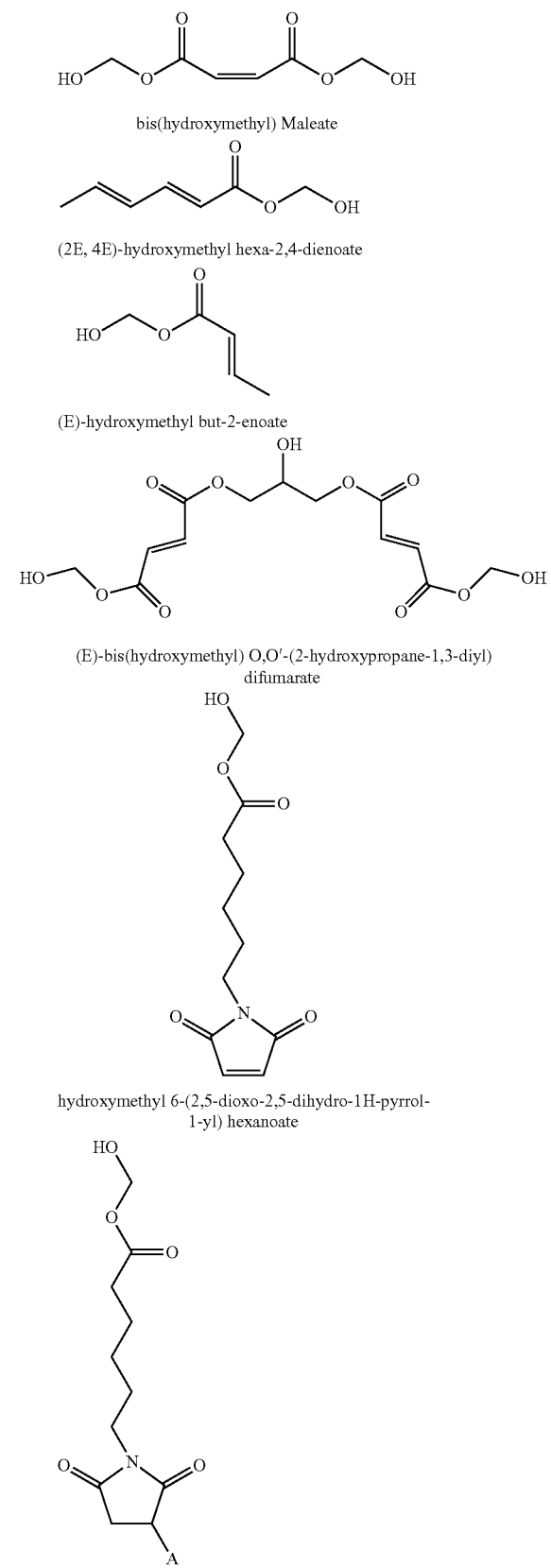

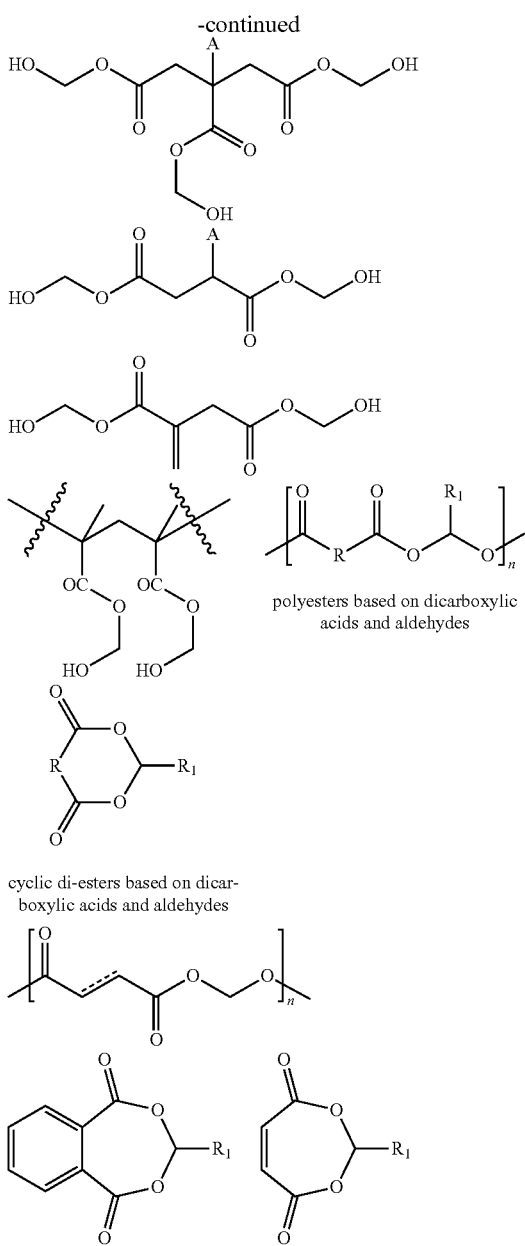

polyesters based on dicarboxylic acids and aldehydes cyclic di-esters based on dicarboxylic acids and aldehydes where: R=aliphatic, cyclic, acyclic, saturated, olefinic, aromatic;
R1=H, aliphatic, cyclic, acyclic, saturated, olefinic, aromatic;
A=—OH, —OPO$_3$M, —SO$_3$M, —PO$_3$M$_2$; —OSO$_3$M;
M=H or metal ion; and
n=between 2 and 100 (preferably between 5 and 50, and more preferably between 10 and 20).

Examples

Example 1

Synthesis Procedure for Bis(Hydroxymethyl) Maleate

To a stirred solution of maleic acid (50 g) in ethanol (80 mL) heated to 60° C. in a round bottom flask was added a catalytic amount of 45% Potassium hydroxide (0.8 g). Paraformaldehyde prills (32 g) were then added portionwise to the stirred solution over a 45 minute period and allowed to react for 5 hours. The reaction mixture yielded an ethanolic solution of maleate derivatives including the desired Bis (hydroxylmethyl) maleate.

Example 2

Performance of Hydrogen Sulfide Scavenging Compounds

The performance of various hydrogen sulfide scavenging compounds, including a number of alpha-hydroxy alkyl esters, was measured using a dynamic testing apparatus. A cadmium chloride solution was prepared by adding 125 grams of CdCl$_2$×2.5H$_2$O to a small amount of water and dilution to 1 liter. Next, a 0.01 molar concentration solution of HCl is made using 8.5 milliters of concentrated HCl diluted to 1 liter. A 0.1N iodine solution and 0.1N Na$_2$S$_2$O$_3$ solution were purchased for the iodiometric titrations along with a starch reagent.

A dynamic testing apparatus was used to perform a dynamic test as described in ASTM-D5705. Accordingly, two sparging flasks were filled with the CdCl$_2$ solution and 15 ml of the 0.01M HCl solution. The two flasks were connected using ⅝" ID tubing. One of the hydrogen sulfide scavenging compounds was then placed into an empty sparging flask, which was itself connected by tubing to the flasks containing the CdCl$_2$ solutions. The system was then purged with nitrogen gas to displace any hydrogen sulfide from the fluid medium. CdS production was indicated by the formation of a yellow precipitate. A sour fluid sample was dosed with the scavenger chemistry being screened, sealed and placed into a heated mixing oven to simulate heated agitation.

The scrubbed CdS from the flasks was removed once the hydrogen sulfide had been completely purged and was placed into a beaker for titration. A magnetic stir bead was added to the beaker and placed onto a stir plate. Iodine solution and starch were added until the mixture had changed to the color of the iodine. Na$_2$S$_2$O$_3$ was then used to titrate the iodine/CdS mixture. The CdS mixture was then titrated until the solution turned clear (endpoint). A calculation was used to determine the remaining hydrogen sulfide using the results from the titration. This procedure allowed for measurement of H$_2$S in the original fluid medium without interference from the reaction product of the hydrogen sulfide scavenging compound and H$_2$S.

TABLE 1

Results of Performance Testing

| Scavenger Composition | Hydrogen Sulfide Removed in Liquid Phase (%) | Extent of Reaction (%) |
|---|---|---|
| Glycerol bis-hemiformal | 89 | 18 |
| Bis hydroxylmethyl maleate | 39 | 58 |
| Triazine | 76 | 31 |

Table 1 shows the efficacy of a hydrogen sulfide scavenging compound in terms of the percent of H$_2$S removed and the percent extent of reaction. The percent of H$_2$S removed is related to the overall scavenging capacity of the chemical. A high percent of percent of H$_2$S removed is desired. The percent extent of reaction is calculated based on the ratio of the chemical's theoretical capacity versus the actual capacity. It is desired to have a high percent extent of reaction indicating that the scavenger molecule is reacting preferentially with the sulfur species to a greater extent so as not to be wasted in the scavenging process. Depending upon the chemical application a more prolonged effect of $H_2S$ may be desired versus a fast acting scavenging agent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of reducing the amount of hydrogen sulfide in a hydrocarbon-containing fluid, the method comprising:
   contacting the hydrocarbon-containing fluid with a treatment fluid including at least one alpha-hydroxy alkyl ester, wherein the hydrogen sulfide reacts with the alpha-hydroxy alkyl ester to reduce an amount of the hydrogen sulfide in the hydrocarbon-containing fluid; and
   wherein the alpha-hydroxy alkyl ester is selected from the group consisting of bis(hydroxymethyl) maleate; (2E, 4E)-hydroxymethyl hexa-2,4-dienoate; (E)-hydroxymethyl but-2-enoate; (E)-bis(hydroxymethyl) O,O'-(2-hydroxypropane-1,3-diyl) difumarate; hydroxymethyl 6-(2,5-dioxo-2,5-dihydro-1H-pyrrol-1-yl)hexanoate; and a combination thereof.

2. The method of claim 1, wherein the reaction product is amine-free.

3. The method of claim 1, wherein the treatment fluid includes between 5 and 20 volume percent of the alpha-hydroxy alkyl ester.

4. The method of claim 1, wherein the treatment fluid includes between 10 and 15 volume percent of the alpha-hydroxy alkyl ester.

5. The method of claim 1, wherein the treatment fluid includes a mixture of water and ethanol.

6. The method of claim 1, wherein the hydrocarbon-containing fluid has been produced from a subterranean formation.

7. The method of claim 6, wherein the hydrocarbon-containing fluid is a gas.

8. The method of claim 7, wherein the contact between the hydrocarbon-containing fluid and the treatment fluid occurs in an absorption tower.

9. The method of claim 1, wherein contacting the hydrocarbon-containing fluid with the treatment fluid including the at least one alpha-hydroxy alkyl ester comprises:
   pumping the treatment fluid under pressure through a wellbore into a subterranean formation and maintaining the treatment fluid in the region around the wellbore for a predetermined period of time, wherein the alpha-hydroxy alkyl ester adsorbs onto the subterranean formation in a region around the wellbore; and
   flowing the hydrocarbon-containing fluid from the subterranean formation into the wellbore, wherein the hydrogen sulfide reacts with the alpha-hydroxy alkyl ester as the hydrocarbon-containing fluid flows through the region around the wellbore to reduce an amount of hydrogen sulfide in the hydrocarbon-containing fluid before the hydrocarbon-containing fluid flows into the wellbore.

10. The method of claim 9, wherein the treatment fluid is maintained in the region around the wellbore for a predetermined period of time to allow the alpha-hydroxy alkyl ester to absorb onto the subterranean formation.

11. The method of claim 1, wherein the alpha-hydroxy alkyl ester comprises bis(hydroxymethyl) maleate.

12. The method of claim 1, wherein the alpha-hydroxy alkyl ester comprises (2E, 4E)-hydroxymethyl hexa-2,4-dienoate.

13. The method of claim 1, wherein the alpha-hydroxy alkyl ester comprises (E)-hydroxymethyl but-2-enoate.

14. The method of claim 1, wherein the alpha-hydroxy alkyl ester comprises (E)-bis(hydroxymethyl) O,O'-(2-hydroxypropane-1,3-diyl) difumarate.

15. The method of claim 1, wherein the alpha-hydroxy alkyl ester comprises hydroxymethyl 6-(2,5-dioxo-2,5-dihydro-1H-pyrrol-1-yl)hexanoate.

* * * * *